US012468585B2

(12) United States Patent
Shriwas et al.

(10) Patent No.: US 12,468,585 B2
(45) Date of Patent: Nov. 11, 2025

(54) INVENTORY MANAGEMENT SYSTEM FOR MANAGING FUNCTIONS, RESOURCES AND SERVICES OF A TELECOMMUNICATIONS NETWORK

(71) Applicant: RAKUTEN MOBILE, INC., Tokyo (JP)

(72) Inventors: Pawan Shriwas, Indore (IN); Apurva Tripathi, Indore (IN); Krishna Patel, Indore (IN); Abhay Mahajan, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/010,074

(22) PCT Filed: Sep. 20, 2022

(86) PCT No.: PCT/US2022/044057
§ 371 (c)(1),
(2) Date: Dec. 13, 2022

(87) PCT Pub. No.: WO2024/063757
PCT Pub. Date: Mar. 28, 2024

(65) Prior Publication Data
US 2024/0248776 A1 Jul. 25, 2024

(51) Int. Cl.
*G06F 9/54* (2006.01)
*H04L 41/08* (2022.01)
(Continued)

(52) U.S. Cl.
CPC .......... *G06F 9/547* (2013.01); *H04L 41/0816* (2013.01); *H04L 41/0869* (2013.01); *H04W 4/50* (2018.02)

(58) Field of Classification Search
CPC ... H04L 41/0816; H04L 41/0803; H04W 4/50
See application file for complete search history.

(56) References Cited

U.S. PATENT DOCUMENTS

2005/0022153 A1* 1/2005 Hwang .................. G06Q 10/10
717/100

OTHER PUBLICATIONS

International Search Report dated Jan. 24, 2023, issued in International Application No. PCT/US2022/044057.
(Continued)

*Primary Examiner* — Ahmad F. Matar
*Assistant Examiner* — Jirapon Tulop
(74) *Attorney, Agent, or Firm* — Sughrue Mion, PLLC

(57) ABSTRACT

A system, method and computer-readable recording medium for managing functions, resources and services of a telecommunications network. The method includes receiving a query for a change of inventory in a telecommunications network; obtaining a specification of an inventory entity to be changed; evaluating the specification of the inventory entity to be changed based on type or property of the inventory entity; creating a vertex for the inventory entity to be changed among vertices of existing inventory of the telecommunications network; creating a relationship between the vertex of the inventory entity to be changed and the vertices of the existing inventory based on the evaluation; creating a constraint between the inventory entity to be changed and the existing inventory in the telecommunications network based on the relationship; validating the constraint; and commit the inventory entity to be changed based on the validation.

17 Claims, 10 Drawing Sheets

(51) Int. Cl.
*H04L 41/0816* (2022.01)
*H04L 41/0869* (2022.01)
*H04W 4/50* (2018.01)

(56) References Cited

OTHER PUBLICATIONS

Written Opinion dated Jan. 24, 2023, issued in International Application No. PCT/US2022/044057.

* cited by examiner

INVENTORY MANAGEMENT SYSTEM FOR MANAGING FUNCTIONS, RESOURCES AND SERVICES OF A TELECOMMUNICATIONS NETWORK

CROSS REFERENCE TO RELATED APPLICATIONS

This application is a National Stage of International Application No. PCT/US2022/044057, filed Sep. 20, 2022.

TECHNICAL FIELD

Apparatuses and methods consistent with example embodiments of the present disclosure relate an inventory management system for managing functions, resources and services of a telecommunications network.

BACKGROUND

In the related art, an inventory management system includes a software platform having applications and computational hardware resources for managing the network resources of a telecommunications network. According to the related art, the total inventory (e.g., network resources) of the telecommunications network is separated into various types of inventories. That is, each type of inventory of the telecommunications network is stored in a separate inventory management system. For example, physical resources (e.g., network elements, cards, slots and ports) are stored in a hardware resources inventory management system, logical resources (e.g., logical devices, circuits, configurations and IP addresses, etc.) are stored in a logical resources inventory management system, associated documentation (e.g., agreements, individuals, organizations, locations, addresses, etc.) is stored in an associated documentation inventory management system, network topology information about the telecommunications network resources is stored in a network topology inventory management system, etc.

As a result, large amount of data that has to be entered into a plurality of inventory management systems. In addition, to obtain a complete overview of the inventory, the data has to be referenced between the different inventory management systems. This fragmented system architecture of the related art is therefore prone to all kinds of errors (e.g., human errors, technical errors, maintenance errors, etc.) and is inefficient in day-to-day operations.

Moreover, related art inventory management systems are based on relational database management systems (RDBMS) which have fixed data models (i.e., no flexible data models) that determine the logical structure of the database. As a result, any change in properties for the inventory (i.e., properties of an inventory to be created, uploaded, read or deleted) needs reprogramming (i.e., adjustment) of the data model of the database. This frequent reprogramming of data models is a challenging task that causes long delays in the processing of a request for an inventory to be created, uploaded, read, deleted, etc. For example, the inventory of a telecommunication network comprises many different network components which have different properties. In the related art system architecture, the fragmented ecosystem and the frequent reprogramming as set forth above can cause inconsistent improper data to be input into the inventory management systems.

In particular, for a telecommunication network being an open radio access network (O-RAN), the wide variety of physical, logical and visualized O-RAN resources (i.e., O-RAN functions, O-RAN services, etc.) make it difficult to operate a plurality of inventory management system for each inventory type or property. In addition, manual reprogramming of data models (e.g., database tables, scripts for each entity, etc.) leads to human errors in managing (e.g., entering) inventory to a related art inventory management system.

SUMMARY

According to embodiments, systems and methods are provided for an inventory management system for managing functions, resources, and services of a telecommunications network. The enhanced inventory management system provides a centralized system architecture based on microservices, which have the advantage of simplifying the operation of inventory management and eliminating human errors in the operation of the inventory management system. To this end, a first microservice (i.e., an inventory manager service) provides a dynamic schema management that allows for a unified data model for all kinds of inventory, wherein an update and an adjustment of the data model can be performed in runtime in the production network (i.e., a flexible data model feature that can be updated and adjusted by uploading a schema file without any code reprogramming). The dynamic schema management has the advantage that requests for an inventory to be created, uploaded, read, deleted, etc. in the enhanced inventory management system can be processed faster, and more efficiently without errors (e.g., human errors, technical errors, maintenance errors, etc.)

Moreover, the enhanced inventory management system provides a second microservice (i.e., a resource recommendation service) that simplifies the retrieval of network resource information for new entities in the telecommunications network inventory (e.g., new inventory, changes to inventory such as network functions, network infrastructure, network services, etc.). The resource recommendation service has the advantage that it eradicates human error in calculating and allocating network resources in accordance with their topological locations within the telecommunications network.

In addition, the enhanced inventory management system provides a third microservice (i.e., a discovery service) that automatizes the retrieval of IP configuration-related properties of the existing inventory of the telecommunications network. The automation has the advantage that the inventory management system uses an up-to-date IP configuration for its inventory in the telecommunications network to avoid inconsistent/incorrect data (i.e., inventory properties) being added to the inventory management system during onboarding or offboarding of inventory.

Finally, according to the enhanced inventory management system, the creation and management of inventory such as physical resources (e.g., network elements, cards, slots, and ports), logical resources (e.g., logical devices, circuits, configurations, IP addresses, etc.), virtual resources (e.g., virtual network functions, network services, etc.) as well as the management of associated documentation (e.g., agreements, individuals, organizations, locations, addresses, topological network data, etc.) is simplified and centralized to a system architecture comprising microservices as set forth above. To this end, a fourth microservice (i.e., an inventory user interface (UI) service) provides a graphical presentation of all microservices of the inventory management system that eliminates human error and increases service delivery and service assurance of entities (i.e., network resources) in the telecommunications network inventory.

According to embodiments, an inventory management system for managing functions, resources and services of a telecommunications network, the system includes: a memory storing instructions; at least one first processor configured to execute first instructions, of a first microservice, to: receive a query for a change of inventory in a telecommunications network from an application programming interface gateway; obtain a specification of an inventory entity to be changed from a database; evaluate the specification of the inventory entity to be changed based on type or property of the inventory entity; create a vertex for the inventory entity to be changed among vertices of existing inventory of the telecommunications network; create at least one relationship between the vertex of the inventory entity to be changed and the vertices of the existing inventory of the telecommunications network based on the evaluation of the specification; create at least one constraint between the inventory entity to be changed and the existing inventory in the telecommunications network based on the at least one relationship of the inventory entity to be changed and the existing inventory in the telecommunications network; validate the least one constraint between the inventory entity to be changed and the existing inventory of the telecommunications network; and commit the inventory entity to be changed based on the validation of the at least one constraint between the inventory entity to be changed and the existing inventory of the telecommunications network.

The system may further include at least one first processor further configured to execute the first instructions of the first microservice to: check at least one relationship type and label from the specification of the inventory entity to be changed; validate the at least one relationship between each vertex of the inventory entity to be changed and the vertices of the existing inventory.

The system may further include at least one first processor configured to execute second instructions, of a second microservice, to: receive a request for a resource recommendation for the inventory entity to be changed from an application programming interface (API) gateway; obtain the specification of the inventory entity to be changed from the database; track status of existing inventory network resources in the telecommunications network; obtain network resource information of the existing inventory of the telecommunications network; calculate an allocation of available capacities of the network resources of the existing inventory based on the obtained network resource information; create a resource recommendation for the inventory entity to be changed in the telecommunications network based on the calculated allocation of available capacities of the network resources of existing inventory.

The network resource information of the existing inventory comprises at least one of a hardware resource information, a resource location information, a resource status information and network topology information of the existing inventory of the telecommunications network.

The system may further include at least one first processor further configured to execute the second instructions of the second microservice to: store the resource recommendation in the database to create a historical list of recommendations.

The system may further include at least one first processor further configured to execute the second instructions of the second microservice to: store the resource recommendation for the inventory entity to be changed in a relational database management system (RDMS) as an update to the specification of the inventory entity to be changed, wherein the RDMS communicates with the first microservice.

The system may further include at least one first processor further configured to execute the second instructions, of the second microservice, to: communicate the resource recommendation for the inventory entity to be changed to the first microservice as a constraint between the vertex of the inventory entity to be changed and the vertices of the existing inventory in the telecommunications network.

The system may further include at least one first processor configured to execute third instructions, of a third microservice, to: receive a request for discovery and reconciliation of existing network resources of the telecommunications network; obtain an internet protocol (IP) mapping specification of the existing inventory network resources of the telecommunications network; track the existing inventory network resources of the telecommunications network based the obtained IP mapping information specification; validate an IP configuration of the existing inventory network resources of the telecommunications network based on the obtained IP configuration specification; and create a near real-time network resource availability information of the existing inventory network resources of the telecommunications network.

The system may further include at least one first processor further configured to execute the third instructions of the third microservice to: communicate the near real-time network resource availability information of existing inventory network resources of the telecommunications network to an inventory enrichment cloud management as a service platform (CMaaS), wherein the inventory enrichment CMaaS communicates with the first microservice.

The system may further include at least one first processor further configured to execute the third instructions of the third microservice to: communicate the near real-time network resource availability information to the first microservice as a constraint between the vertex of the inventory entity to be changed and the vertices of the existing inventory of the telecommunications network.

The system may further include at least one first processor configured to execute the second instructions of the second microservice to: communicate with other microservices to augment resource recommendations to utilize near real-time network resource availability information created by the third microservice.

The near real-time network resource availability information comprises at least one of a load information, IP configuration information and network key performance indicators of available network resources in the telecommunications network.

According to embodiments, a method for managing functions, resources and services of a telecommunications network, the methods includes: receiving a query for a change of inventory in a telecommunications network from an application programming interface gateway; obtaining a specification of an inventory entity to be changed from a database; evaluating the specification of the inventory entity to be changed based on type or property of the inventory entity; creating a vertex for the inventory entity to be changed among vertices of existing inventory of the telecommunications network; creating at least one relationship between the vertex of the inventory entity to be changed and the vertices of the existing inventory of the telecommunications network based on the evaluation of the specification; creating at least one constraint between the inventory entity to be changed and the existing inventory in the telecommunications network based on the at least one relationship of the inventory entity to be changed and the existing inventory in the telecommunications network; validating the least one constraint between the inventory entity to be changed and the existing inventory of the telecommunications network; and committing the inventory entity to be changed based on the validation of the at least one constraint between the inventory entity to be changed and the existing inventory of the telecommunications network.

The method may further include: receiving a request for a resource recommendation for the inventory entity to be changed from an application programming interface (API) gateway; obtaining the specification of the inventory entity to be changed from the database; tracking status of existing inventory network resources in the telecommunications network; obtaining network resource information of the existing inventory of the telecommunications network; calculating an allocation of available capacities of the network resources of the existing inventory based on the obtained network resource information; creating a resource recommendation for the inventory entity to be changed in the telecommunications network based on the calculated allocation of available capacities of the network resources of existing inventory.

The network resource information of the existing inventory comprises at least one of a hardware resource information, a resource location information, a resource status information and network topology information of the existing inventory of the telecommunications network.

The method may further include: receiving a request for discovery and reconciliation of existing network resources of the telecommunications network; obtaining an internet protocol (IP) mapping specification of the existing inventory network resources of the telecommunications network; tracking the existing inventory network resources of the telecommunications network based the obtained IP mapping information specification; validating an IP configuration of the existing inventory network resources of the telecommunications network based on the obtained IP configuration specification; and creating a near real-time network resource availability information of the existing inventory network resources of the telecommunications network.

According to embodiments, a non-transitory computer-readable recording medium having recorded thereon instructions executable by at least one processor to perform a method for managing functions, resources and services of a telecommunications network, the method includes: receiving a query for a change of inventory in a telecommunications network from an application programming interface gateway; obtaining a specification of an inventory entity to be changed from a database; evaluating the specification of the inventory entity to be changed based on type or property of the inventory entity; creating a vertex for the inventory entity to be changed among vertices of existing inventory of the telecommunications network; creating at least one relationship between the vertex of the inventory entity to be changed and the vertices of the existing inventory of the telecommunications network based on the evaluation of the specification; creating at least one constraint between the inventory entity to be changed and the existing inventory in the telecommunications network based on the at least one relationship of the inventory entity to be changed and the existing inventory in the telecommunications network; validating the least one constraint between the inventory entity to be changed and the existing inventory of the telecommunications network; and committing the inventory entity to be changed based on the validation of the at least one constraint between the inventory entity to be changed and the existing inventory of the telecommunications network.

The non-transitory computer-readable recording medium, wherein the method may further include: receiving a request for a resource recommendation for the inventory entity to be changed from an application programming interface (API) gateway; obtaining the specification of the inventory entity to be changed from the database; tracking status of existing inventory network resources in the telecommunications network; obtaining network resource information of the existing inventory of the telecommunications network; calculating an allocation of available capacities of the network resources of the existing inventory based on the obtained network resource information; creating a resource recommendation for the inventory entity to be changed in the telecommunications network based on the calculated allocation of available capacities of the network resources of existing inventory.

The network resource information of the existing inventory comprises at least one of a hardware resource information, a resource location information, a resource status information and network topology information of the existing inventory of the telecommunications network.

The non-transitory computer-readable recording medium, wherein the method may further include: receiving a request for discovery and reconciliation of existing network resources of the telecommunications network; obtaining an internet protocol (IP) mapping specification of the existing inventory network resources of the telecommunications network; tracking the existing inventory network resources of the telecommunications network based the obtained IP mapping information specification; validating an IP configuration of the existing inventory network resources of the telecommunications network based on the obtained IP configuration specification; and creating a near real-time network resource availability information of the existing inventory network resources of the telecommunications network. Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
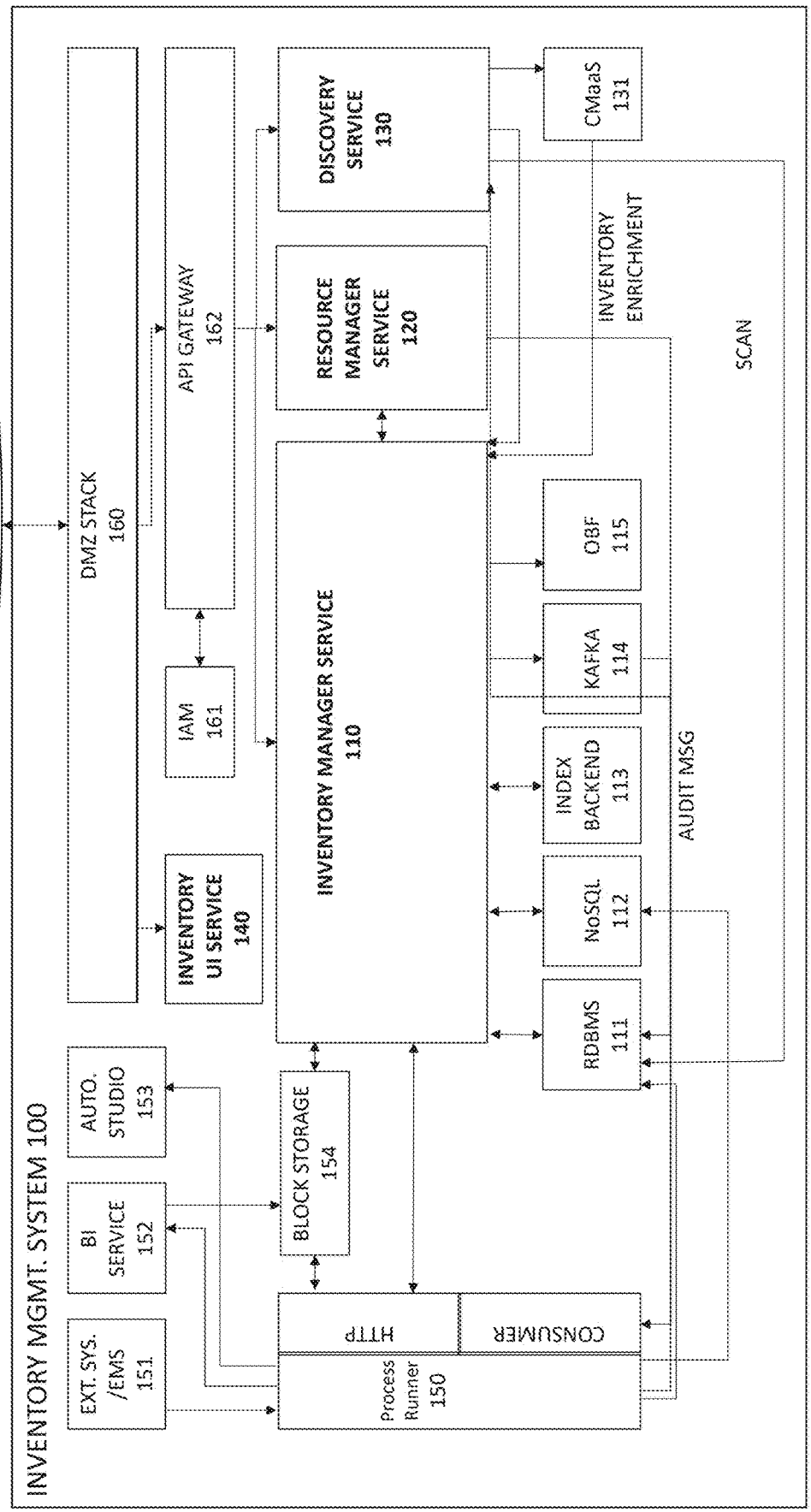
FIG. 1 is a diagram of an inventory management system according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which a plurality microservices allow for a flexible and centralized system architecture of an inventory management system for managing functions, resources, and services of a telecommunications network. The method and system automate information retrieval of the existing inventory (i.e., network resources and IP-configurations) in order to input consistent data to the inventory management system. Further, there is no need for manual reprogramming the inventory management system based on the type of inventory to be stored in the system. As a result, human error and time cost in inputting information can be eliminated.

FIG. 1 is a diagram of an inventory management system according to an embodiment. Referring to FIG. 1, the centralized system architecture of the inventory management system includes, among other microservices, an inventory manager service 110, a resource manager service 120, a discovery service 130, and an inventory UI service 140 (each of which may be embodied by one or more microservices).

In FIG. 1, a user can connect to the inventory management system via demilitarized zone (DMZ) stack 160 (i.e., a physical or logical subnetwork that divides the inventory management system from third-party networks/systems) to an application programming interface (API) gateway 162. The DMZ stack also connects the inventory user interface (UI) service 140. The inventory UI service 140 generates and presents all graphic user interfaces (GUI) for the inventory management system to interact with, for example, users or sub-systems from physical or logical subnetworks. The inventory UI service 140 includes all graphical user interfaces (GUIs) to present the content of the inventory management system and allow for all kinds of interaction (e.g., create, read, update, and delete (CURD) operation) within the inventory management system.

In an example embodiment, the inventory management system may be connected to a third-party sub-system for an automatized creation of inventory (e.g., an automatized onboarding of new network resources (e.g., new functions, resources, and services of the telecommunications network). In an example embodiment, API Gateway 162 may receive a user request for a manual CURD operation (e.g., creation, update, read, deletion of inventory) via the inventory UI service 140.

The API Gateway 162 connects to an identity and access management (IAM) database for authentication users or third-party sub-systems (e.g., determining their role, access rights, etc. in the inventory management system). Moreover, the API Gateway 162 connects to the inventory manager service 110, the resource manager service 120, and the discovery service 130.

The inventory manager service 110 connects to various types of databases to retrieve data for evaluating the properties of entities (i.e., inventory) to be created, updated, read, and deleted (i.e., undergo CURD operations). The inventory manager service 110 connects to a relational database management system (RDBMS) 111, a graph database 112 (i.e., a NoSQL database), an indexing backend 113 (e.g., an open-source indexing microservice), an event streaming platform 114 (e.g., a KAFKA data storage), an observability framework (OBF) database 115 (e.g., a monitoring database handling all alerts of the inventory manager service 110).

The RDBMS 111 connects to the inventory manager service 110 and a process runner 150 (e.g., a SPARK application to process NIFI data). The process runner 150 enables data upload and download between the RDBMS 111 and all kinds of internal and external systems/services. The RDBMS 111 stores meta information (e.g., resource states, resource data, resource locations, etc.) of the inventory stored in the graph database 112.

The graph database 112 (e.g., a CASSANDRA database) connects the inventory manager service 110. Moreover, the graph database 112 connects to the process runner 150 which enables data upload and download between the graph database 112 and all kinds of internal and external systems/services. In an example embodiment, the graph database 112 may be a JANUSGRAPH-supported NoSQL database that can connect to the inventory manager service 110 via a graph interface application interface (API) (e.g., a TINKERPOP API).

The process runner 150 includes an HTTP server and consumer platform. The HTTP server connects to the inventory manager service 110 via a representational state transfer (REST) API. The HTTP server also connects to a block storage 154. The block storage 154 communicates with a business intelligence (BI) service 152 and the inventory manager service 110. Moreover, the process runner 150 communicates with other microservices such as external systems 151 (e.g., an enterprise messaging service (EMS) server running, for example, a TIBCO EMS) and technical design services (e.g., AUTOMATION STUDIO) 153.

The API gateway 162 connects to the resource manager service 120. The resource manager service 120 is a microservice that checks and provides recommendations for network resources (e.g., hardware resources and location of the resources for running O-RAN functions, O-RAN services, etc.). In an example embodiment, the resource manager service 120 may provide information about the number of CPUs, cores, pods, etc., available at a location for instating, for example, a virtualized central unit vCU, a virtualized distributed unit vDU, etc., in an O-RAN network. The resource manager service 120 connects to the inventory manager service 110. In addition, the resource manager service 120 connects to the RDBMS 111.

Moreover, the API gateway 162 connects to the discovery service 130. The discovery service 130 is a microservice that creates IP configuration data for each inventory entity in the telecommunications network. In an example embodiment, the discovery service 130 may provide information about IP ranges of network resources such as switches, routers, etc. The discovery service 130 communicates to the process runner for scanning the existing inventory (i.e., the telecommunications network topology) for network resources, functions and services in the telecommunications network.

The discovery service 130 may also communicate with a cloud management as a service (CMaaS) platform 131. The CMaaS platform 131 connects to the process runner 150 to obtain administrative and management information on the existing inventory from external microservices. In particular, the CMaaS platform 131 enriches the internet protocol (IP) configuration data of existing inventory according to the scanned IP addresses from the discovery service 130. To this end, the cloud management as a service (CMaaS) may provide labeling and configuration information of each existing inventory, real-time reporting of capacity and usage of existing entities, and reporting of overstretched (i.e., overloaded) resources and locations according to its IP address. Both, the cloud management as a service (CMaaS) platform 131 and the discovery service can connect to the inventory manager service 110.

Figure 2:
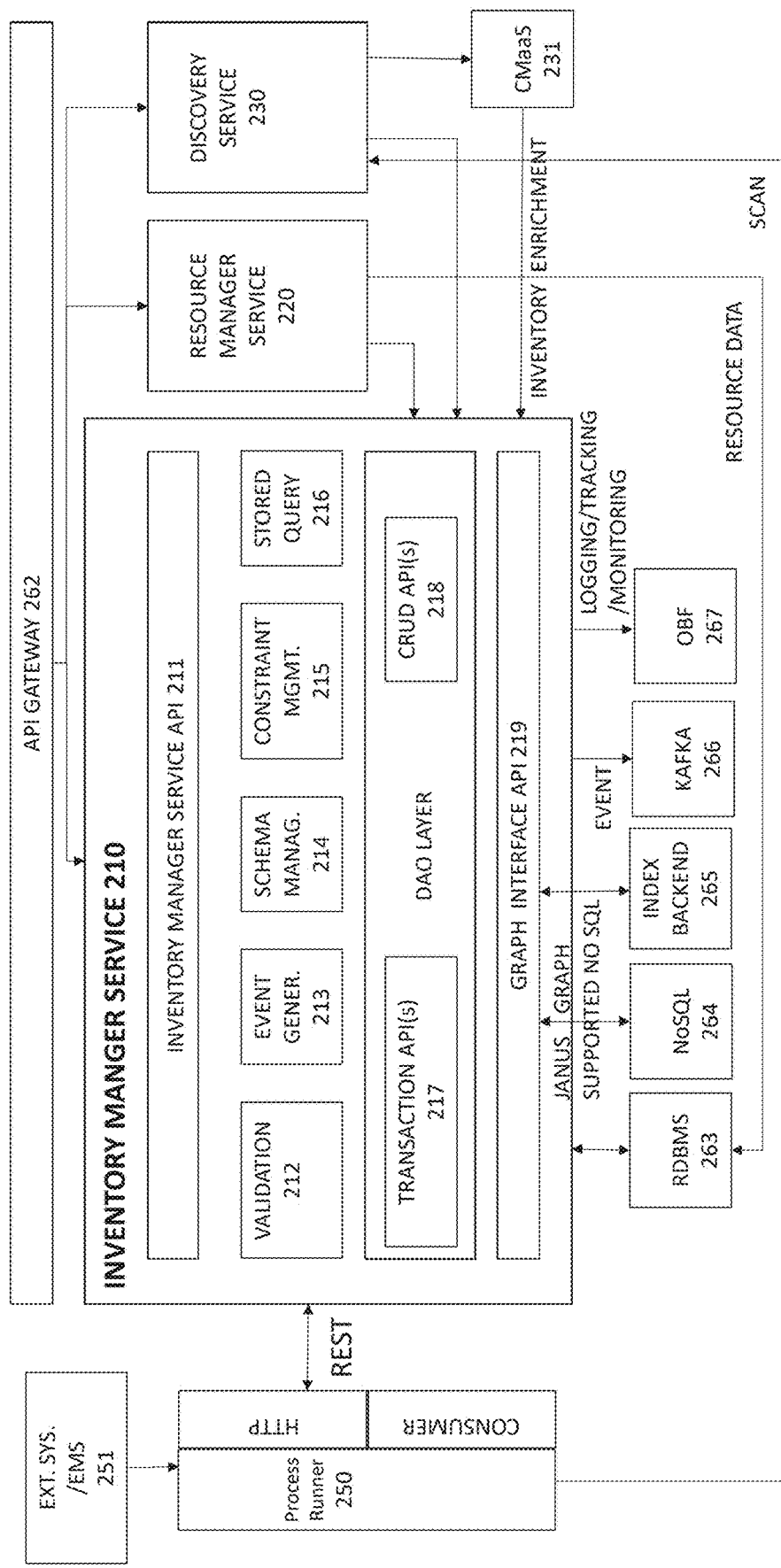
FIG. 2 is a diagram of an inventory manager service of the inventory management system according to an embodiment.

FIG. 2 is a diagram of an inventory manager service of the inventory management system according to an embodiment. Referring to FIG. 2, the diagram illustrates the system architecture of the inventory management system, focusing on an inventory manager service 210. In FIG. 2, the inventory manager service 210 includes an inventory manager service API 210. In an example embodiment, the inventory manager service API 210 may include tele-management forum TMF API(s) (e.g., a TMF 638 and/or a TMF 639 API). In addition, the inventory manager service API 210 may include other API(s) for all kinds of CURD operations in the inventory manager service 210.

The inventory manager service 210 includes a validation service instance 212, an event generator service instance 213, a schema manager service instance 214, a constraint management service instance 215, and a service instance for managing the stored queries 216.

The validation service instance 212 is a microservice that evaluates the consistency and correctness of inventory property information (e.g., inventory specifications, documentation, etc.). To this end, the validation service instance 212 receives a specification of the inventory to be created from a database and checks, for example, whether the properties of the inventory to be created exist in the specification for said inventory. Furthermore, in an example embodiment, the validation service instance 212 may check if the data type of inventory property information is correct. In another example embodiment, the validation service instance 212 may check for mandatory properties of the inventory to be created defined in the specification. In another example embodiment, the validation service instance 212 may check and add default values for properties of the inventory to be created.

In FIG. 2, an event generator service instance 213 triggers an event (e.g., a CURD operation) in response to a request from a user or a sub-system request. The event generator service instance 213 generates all kinds of inventory change information (e.g., CURD operation event/messages) which enable other service instances in the inventory manager service 201 to capture and synchronize said changes in inventory.

The schema manager service instance 214 is a microservice for implementing a dynamic schema data management which allows the inventory manager service 210 to expand its data schema on the fly (i.e., during live operation of the inventory management system) without any new release or development required (e.g., without reprogramming of a data model or re-development of the database). To this end, the schema manager utilizes a data modeling language file for the definition of data (e.g., property information of the inventory). In an example embodiment, the schema manager service instance may receive a "Yet Another Next Generation" YANG data modeling file for the definition of data to be processed in the inventory manager service 210. In an example embodiment, a user may create and upload the YANG file via the inventory UI service 140 to the inventory manager service 210. By uploading the YANG file, the data model in the inventory management system can be changed without reprogramming.

The dynamic schema data management of the schema manager 214 together with the graph database 213 has the advantage that no reprogramming of the data model for different inventory property information is necessary. For example, if a data model includes a database table of 50 inventory properties and the inventory property information comprises 52 properties, the user may create a YANG file defining the new data model and upload it together with the request for a CURD operation in the inventory management system 210. This flexible data model feature allows for fast processing of requests for on-/off boarding inventory and allows all kinds (types) of inventory (e.g., physical resources, logical resources, virtual resources, location information of the resources and repositories, network topology information, up-to-date information load statuses of network resources per location, up-to-date port and configuration information linking the resources and repositories, etc.).

In FIG. 2, the constraint management service instance 215 is a microservice that performs the constraints management between an inventory (e.g., inventory part or entity) to be created/updated/read/deleted and existing inventory in the telecommunications network. The constraints management, among other constraints, may include unique constraints (e.g., an inventory (server) that was already created (registered) in the inventory management system cannot be registered for a second time), relationship constraints (e.g., a server board can only be in one server rack and not be registered to another server rack), value constraints (e.g., the number of CPUs, cores, etc., of an instated network function cannot exceed the hardware resources allocated for the respective network function). The above constraints are among the core constraints of the inventory management service that prevent inconsistent/incorrect data from being entered into the inventory management system.

The service instance for managing the stored queries 216 is a framework that supports storing the required queries in the database in a predefined manner and using them (the queries) as needed. This has the advantage that the stored queries 216 reduce the execution time of the queries. For example, if all queries are loaded into the stored queries 216 of the inventory management service 210, no further query compilation is required when starting CURD operations.

The application services instances 212 to 216 of the inventory manager service 210 communicate with a graph interface API 219 via a transaction API 217 or a create, read, update, delete (CRUD) API 218 of a data access object (DAO) layer. The graph interface API 219 includes a graph database interface component which enables the graph database 264 (e.g., CASSANDRA NoSQL) to load graph database instance(s) inside the inventory manager service 210. As result, the inventory manager service 210 has a microservice architecture that does not include any database (e.g., RDBMS/SQL) because it is embedding a graph database inside the microservice. For example, every time the inventory manager service 210 needs data from the graph database, it loads an instance of the graph database via the graph interface API 219.

The graph database interface API 219 renders inventory information (e.g., inventory properties) as graph format into the graph database (i.e., NoSQL database). In an example embodiment, the inventory manager service 210 use an embedded deployment type of a JANUSGRAPH-supported NoSQL database which has the advantage that all transaction can be easily managed on a JAVA-based interface. Furthermore, the graph interface API 219 connects to a indexing backend 265 and the inventory manager service 210 connects to a data storage (e.g., KAFKA) 266 and an observability framework database (OBF) 267.

Figure 3:
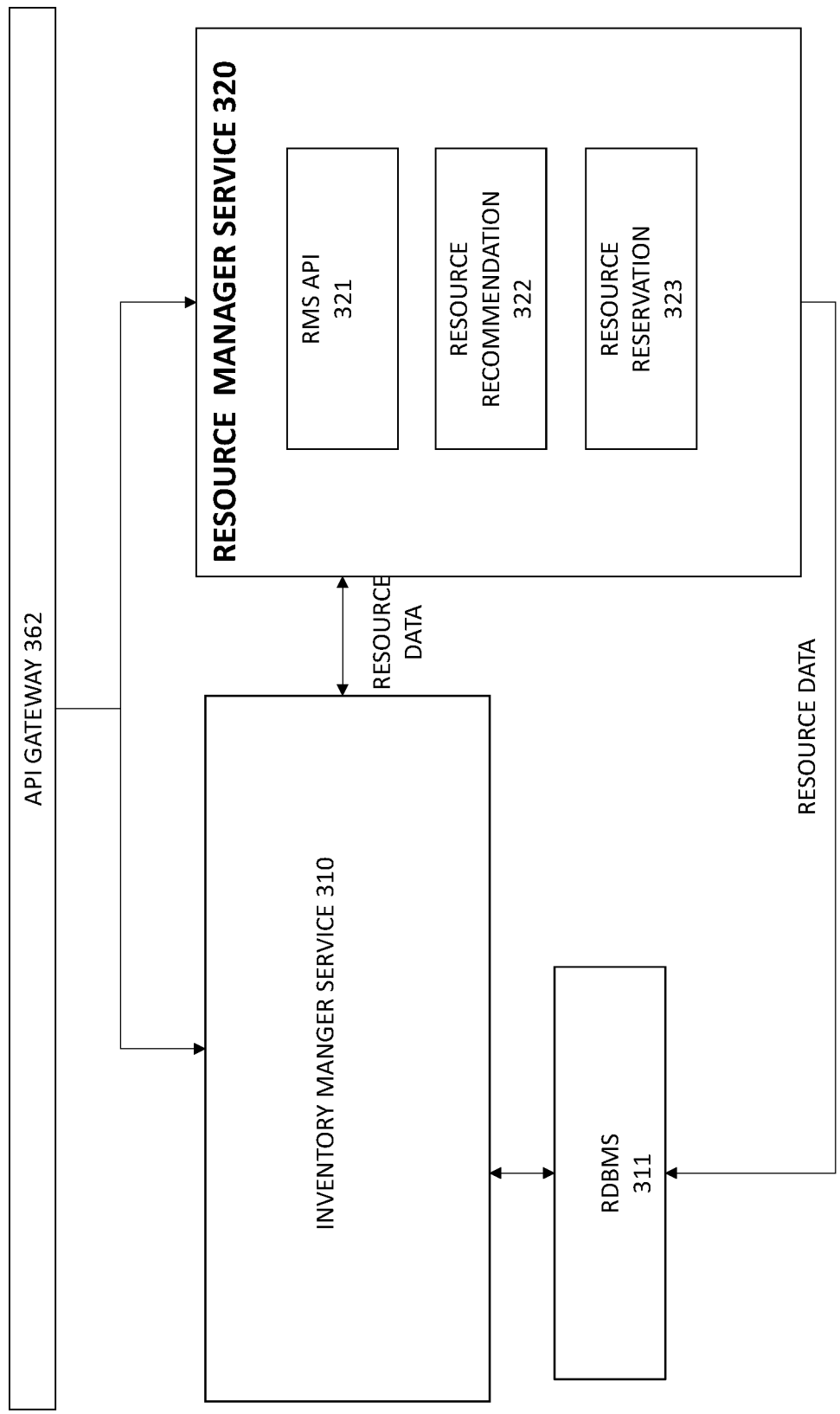
FIG. 3 is a diagram of a resource recommendation service of the inventory management system according to an embodiment.

FIG. 3 is a diagram of a resource recommendation service 320 of the inventory management system according to an embodiment. Referring to FIG. 3, the diagram illustrates the system architecture of the inventory management system, focusing on a resource manager service 320. Referring to FIG. 3, the resource manager service 320 includes a resource manager service (RMS) application interface (API) 321 which connects the recommendation service 320 with the API gateway 362. The API gateway 362 may be the same as or similar to the API gateway 162 of FIG. 1. The RMS API 321 provides a specialized resource recommendation API that encapsulates scenario-based resource queries and calculations, providing ready-to-use responses to other microservices and the API gateway 36. Moreover, the RMS API 321 provides a historical list of recommendations created by the resource manager service 320.

The resource manager service 320 includes a resource recommendation service instance 322 and a resource reservation service instance 323.

The resource manager service 320 is connected to an RDBMS 311. The RDBMS 311 refers to the RDBMS 263 of FIG. 2. The RDBMS 311 communicates resource data of existing inventory in the inventory management system 100 to the resource recommendation service instance 322 and the resource reservation service instance.

The resource recommendation service instance 322 is a service instance that retrieves statuses of network resources (e.g., hardware resources for O-RAN functions and O-RAN services). To this end, the resource recommendation service instance 322 connects to the RDBMS 311 to obtain meta information of the inventory related to the network resources (e.g., number CPUs, cores, hard disk space, etc. available on servers in data centers). As a result, instead of manually identifying a server cluster or a data center with sufficient hardware resources to host an inventory to be created, updated, etc., the resource recommendation service instance 322 evaluates the properties of the inventory to be created (i.e., the resource which are needed for the instantiation of an O-RAN function or an O-RAN service), compares it with available network resources in exiting inventory (i.e., hardware resources) and determines (i.e., makes a recommendation) network resources for an inventory to be created (e.g., the O-RAN function, O-RAN service, etc.).

The automated resource allocation, as performed by the resource recommendation service instance 322, has the advantage of providing new inventory in the telecommunications network with optimal hardware resources in an optimal location (e.g., a location with the lowest traffic latency for the O-RAN function or an O-RAN service to be instantiated).

In addition, the resource recommendation service instance 322 evaluates the impact of allocating resources to the inventory being created (e.g., to the O-RAN functions or O-RAN services being instantiated) on other network elements (existing or planned) in the telecommunications network inventory. This has the advantage of achieving balanced and energy-efficient operation of network resources of the telecommunications network inventory by the resource recommendation service instance 322.

In FIG. 3, the resource reservation service instance 323 is a service instance that retrieves the status of network resources (e.g., hardware resources for O-RAN functions and O-RAN services) and evaluates whether an inventory to be created, updated, etc. (i.e., an O-RAN function or O-RAN service to be instantiated) can be deployed according to constraints set by the constraint management service instance in the inventory management service 310.

In addition, the resource reservation service instance 323 enables the inventory management system to reserve resource capacity from existing inventory resources, thereby preventing that capacity from being allocated to other users of the inventory management system. In an example embodiment, the resource capacity reservation can be passed on to a network infrastructure management microservice to realize an actual reservation. Moreover, in an example embodiment, the reservation service instance 323 can store a historical list of resource reservations to enable viewing, updating, or deletion of a resource reservation history via the inventory UI service 140. In an example embodiment, the reservation service instance 323 can support multiple models of reservation: pre-reserved shared resource pools, or reserve as required.

Accordingly, in an example embodiment, the resource reservation service instance 323 may reserve network resources for an inventory to be created, updated, etc., until a deployment has begun in the real telecommunications network (i.e., the inventory is registered as existing inventory in the inventory management system).

In an example embodiment, in case the constraints refer to insufficient network resources for the inventory to be created, uploaded, etc., the resource reservation service instance 323 may send a resource reservation (e.g., a reservation of hardware resources) to the inventory manager service 310. Furthermore, according to this embodiment, the resource recommendation service instance 322 may evaluate the impact of insufficient network resources for the inventory to be created, uploaded, etc., and associated existing inventory in the telecommunications network, and send a resource recommendation to the inventory management service 310.

The resource recommendation service instance 322 and the resource recommendation services instance 323 can utilize external enrichment from other microservices or external systems. To this end, the resource manager service 320 may integrate external sources that can be used to augment the creation of resource recommendations, for example, real-time utilization, artificial intelligence (AI), machine learning (ML), etc.

Figure 4:
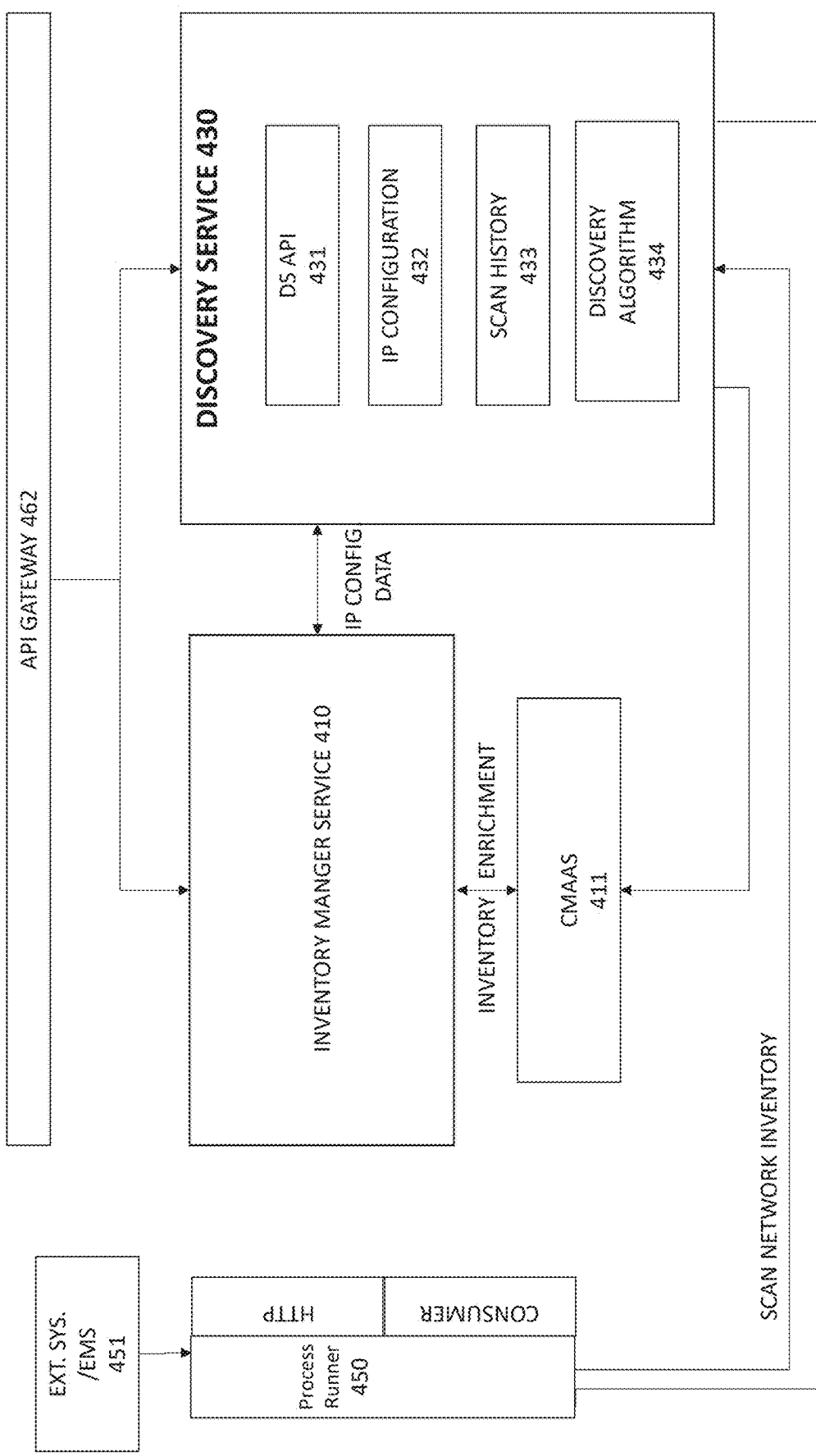
FIG. 4 is a diagram of a discovery service of the inventory management system according to an embodiment.

FIG. 4 is a diagram of a discovery service 430 of the inventory management system according to an embodiment. Referring to FIG. 4, the diagram illustrates the system architecture of the inventory management system, focusing on discovery service 430.

In FIG. 4, the discovery service 430 connects to a process runner 450. The process runner 450 further connects to external systems (e.g., EMS) 451. The processor runner 450 enables the resource manager service 430 to perform a scan of IP addresses via the external systems (e.g., EMS) 451. In an example embodiment, the processor runner 450 enables the discovery service 430 to scan (i.e., to ping) all physical resources (such as network elements, cards, slots, and ports), logical resources (i.e., logical devices such as logical subcomponents of physical resources having IP address or IDs) throughout the telecommunications network inventory. The IP addresses which are successfully scanned (e.g., pinged) are used in the discovery service instance 430 to retrieve, for example, IP address ranges of network resources of the telecommunications network.

In FIG. 4, the resource manager service instance 430 includes a discovery service (DS) application interface (API) 431 which connects the discovery service instance 430 with the API gateway 462. The API gateway 462 refers to the API gateway 162 of FIG. 1.

The discovery service 430 includes an IP configuration service instance 432, a scan history service instance 433, and a discovery algorithm service instance 434. The IP configuration service instance 432 is a service instance that retrieves the IP configuration data from the scanned telecommunications network components as set forth above.

The scan history service instance 433 is a service instance that stores IP addresses of previous network scans (i.e., IP address scans of the network). In an example embodiment, the stored scan history may be used to assess constraints related to network topology changes due to changes in IP configurations of network resources in the telecommunications network.

In FIG. 4, the discovery algorithm service instance 434 is a service instance that retrieves the mapping information of network resources to IP addresses and scans the network resources in accordance with their properties (e.g., determines which network resource refers to which IP address or which network resource refers to which IP range). Though the mapping between IP addresses and network resources may not be performed in the discovery service 430, the discovery algorithm service instance 434 can retrieve the mapping information and perform an intelligent scan for each network component (resource) within the telecommunications network (e.g., the discovery algorithm service instance 434 may identify the IP ranges from the IP configuration and performs steps to discover the devices from the network).

In an embodiment, the discovery service 430 may utilize external enrichment in order to augment the tracking and recording of used/available telecommunications network components (i.e., network resources) throughout the network. To this end, the discovery service 430 may receive inventory records of allocated and available resource capacities of existing (used/available) inventory network resources or push events to an external system to assist in basic resource tracking and allocation of said existing (used/available) inventory network resources.

As a result, the inventory management system includes built-in batched and near real-time discovery and reconciliation that can be used to track resource availability of existing (used/available) inventory network resources to assist users in entering accurate and up-to-date information into the inventory management system.

Still referring to FIG. 4, the discovery service 430 connects to the cloud management as a service (CMaaS) platform 411. The CMaaS platform 411 connects to the process runner 450. The process runner 450 enables the CMaaS platform 411 to obtain administrative and management information of the existing inventory (e.g., network resources of the telecommunications network inventory) from external systems (e.g., EMS) 451. In particular, the CMaaS platform enriches the internet protocol (IP) configuration data of existing inventory according to the scanned IP addresses from the discovery service 130. To this end, the cloud management as a service (CMaaS) may provide labeling and configuration information of each existing inventory, real-time reporting of capacity and usage of existing network resources, and reporting of overloaded network resources according to their IP address. Both, the CMaaS platform 411 and the discovery service 430 connect to the inventory manager service 410.

Figure 5:
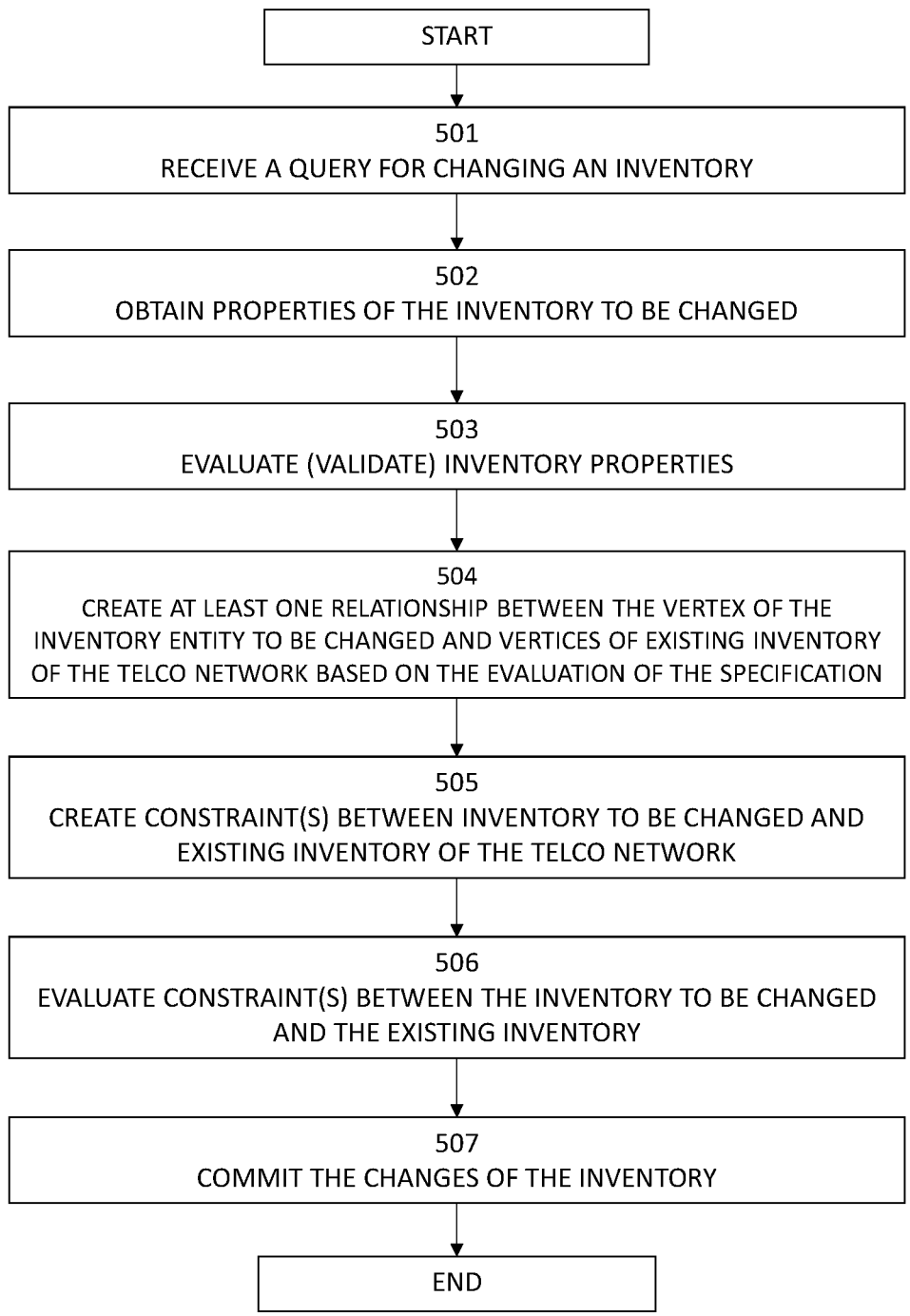
FIG. 5 illustrates a flow diagram of a method for changing inventory in a telecommunications network by an inventory manager service of the inventory manager system according to an embodiment.

FIG. 5 illustrates a flow diagram of a method for changing inventory in a telecommunications network by an inventory manager service of the inventory management system according to an embodiment. Referring to FIG. 5, in step 501, the inventory manager service 210 receives a query for changing (e.g., create, read, update, and delete (CURD)) an inventory via an inventory manager service API 211. In an embodiment, the inventory manager service API 211 may receive a query via an API gateway 262 from an inventory UI service 140 (e.g., a user input). In an embodiment, the inventory manager service API 211 may receive a query via an API gateway 262 from a third-party external sub-system. Based on the query for changing an inventory the event generator service instance 213 generates an event for changing the inventory and stores the query in the service instance for managing the stored queries 216.

In step 502, the inventory manager service 210 obtains properties of the inventory to be changed (e.g., created, read, updated, deleted (CURD)). In an example embodiment, the inventory manager service 210 may retrieve the meta-information about the inventory to be changed from an RDBMS 263. In an example embodiment, the inventory manager service 210 may retrieve via the inventory manager service API 211, for example, from inventory UI service 140, external third-party sub-systems via the API gateway 162, external microservices/systems controlled by the process runner 150, etc.

In step 503, the inventory validation service instance 212 evaluates (i.e., validates) the inventory properties (i.e., the properties in accordance with a specification of the inventory to be changed). In an example embodiment, the validation service instance 212 checks whether the inventory properties are covered by the obtained specification in step 502. In an example embodiment, the validation service instance 212 checks whether a data type of the inventory is correct (i.e., whether the data type of the inventory refers to the data type according to the specification). In an example embodiment, the validation service instance 212 checks whether the mandatory properties of the invention are covered by the obtained specification. Moreover, the validation service instance 212 can check and add default values for properties of the inventory to be changed. In an example embodiment, in case the specification is not valid, the transaction of changing the inventory entity in the inventory management system is discarded (i.e., a rollback transaction is commenced by the inventory manager service 210).

In an example embodiment, in step 503, the user may upload a data modeling file for a definition of the property data to be processed in the inventory manager service 210 (i.e., a data modeling file for defining a data schema for the inventory to be changed). In an example embodiment, a user may create and upload the YANG file via the inventory UI service 140 to the inventory manager service 210. By uploading the YANG file to the schema manager service instance 214 of the inventory manager service 210, the schema manager service instance 214 can adjust the data model in the inventory management system without reprogramming.

In step 504 the inventory manager service 210 creates a vertex for an inventory entity to be changed (e.g., created, read, updated, deleted (CURD)). In an example embodiment, the schema manager service instance may modify a graph database element for the inventory entity to be changed (e.g., created, read, updated, deleted (CURD)). Moreover, in step 504, the inventory manager service 210 creates at least one relationship between the inventory entity to be changed and the existing inventory of the telecommunications network based on the evaluation of the specification of the inventory entity to be changed. In an example embodiment, the inventory manager service 210 creates at least one relationship between the inventory entity to be changed based on the vertex of the inventory entity to be changed and the vertices of existing inventory of the telecommunications network (i.e., graph database entries of existing inventory in the NoSQL database 264).

In step 505, the constraint management service instance 215 creates constraint(s) between inventory to be changed (e.g., created, read, updated, deleted (CURD)) and existing inventory of the telecommunications network. The constraints management service instance 215, among other constraints, may create constraints that may include unique constraints (e.g., an inventory (server) that was already created (registered) in the inventory management system cannot be registered for a second time), relationship constraints (e.g., a server board can only be in one server rack and not be registered to another server rack), value constraints (e.g., the number of CPUs, cores, etc. of an instated network function cannot exceed the hardware resources allocated for the respective network function). The above constraints are among the core constraints of the inventory management service that allows preventing inconsistent/incorrect data from being entered into the inventory management system.

In step 506, the inventory manager service 210 evaluates constraint(s) between the inventory to be changed (e.g., created, read, updated, deleted (CURD)) and the existing inventory of the telecommunications network. In an example embodiment, the validation service instance 212 can evaluate constraint(s) between the inventory to be changed and the existing inventory. In an example embodiment, the constraint management service instance 215 can evaluate constraint(s) between the inventory to be changed and the existing inventory. The evaluation of the constraints is based on predetermined relationships between the inventory to be changed and the existing inventory. In an example embodiment, the predetermined relationships may be stored with the inventory information in the graph database 264 (i.e., the No SQL database).

In step 507, in case the inventory manager service 210 determines that constraint(s) between the inventory to be changed and the existing inventory are fulfilled, the inventory manager service 210 commits the changes (e.g., creation, read, update, deletion (CURD-operation)) of the inventory to a graph database (i.e., NoSQL) 264 in the inventory management system. In an example embodiment, inventory manager service 210 can store meta information in the RDBMS 263.

Figure 6:
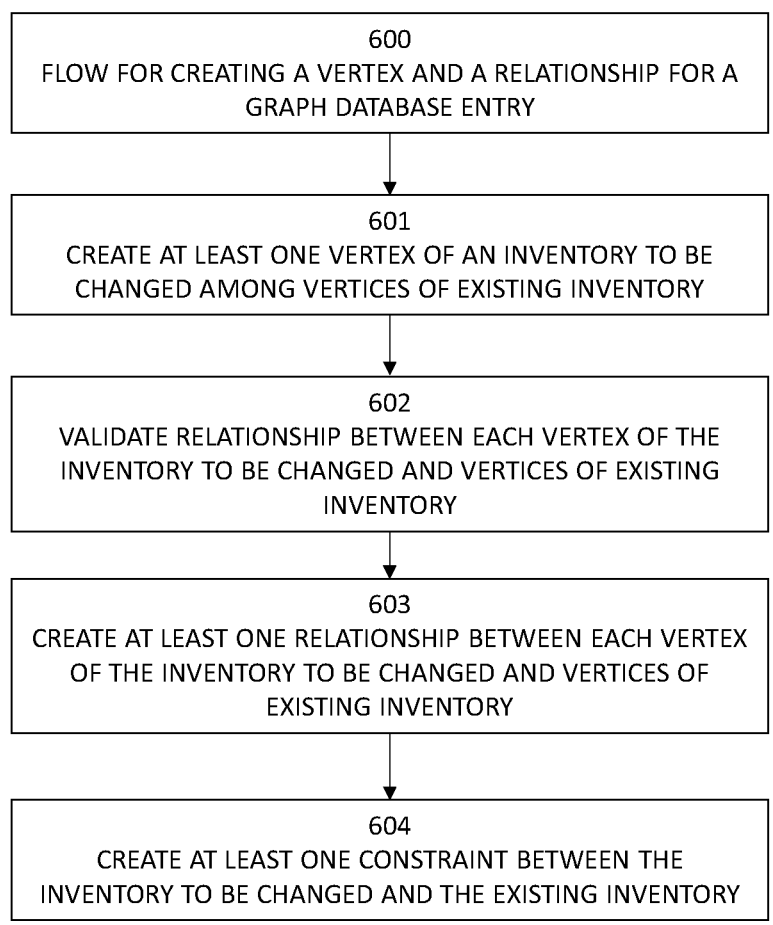
FIG. 6 illustrates a flow diagram of method 600 for creating a vertex and a relationship between an inventory to be changed and existing inventory of the telecommunications network by an inventory manager service for a graph database entry according to an embodiment.

FIG. 6 illustrates a flow diagram of method 600 for creating a vertex and a relationship between an inventory to be changed and the existing inventory of the telecommunications network by an inventory manager service for a graph database entry according to an embodiment.

Referring to FIG. 6, in step 601, the inventory manager service 210 create at least one vertex of an inventory to be changed among vertices of the existing inventory of the telecommunications network.

In step 602, the inventory manager service 210 evaluates the relationship between inventory entities to be changed and the existing inventory of the telecommunications network based on the specification of the inventory entity to be changed. In an example embodiment, the inventory manager service 210, depending on the inventory properties of the inventory entities to be changed and the existing inventory of the telecommunications network, checks the relationship type and label from the specification of the inventory entity to be changed. In an example embodiment, in case the relationship type and label from the specification of the inventory entity to be changed is not correct, the transaction of changing the inventory entity in the inventory management system may be discarded (i.e., a rollback transaction is commenced by the inventory manager service 210).

In step 603, the inventory manager service 210 creates at least one relationship between each vertex of the inventory to be changed and vertices of existing inventory between the inventory entities of the telecommunications network. In an example embodiment, the relationship may include all kinds of information (e.g., logical resources (i.e., logical devices, circuits, IP configurations, IP addresses, etc.), associated documentation (e.g., agreements, individuals, organizations, locations, addresses, etc.). In an example embodiment, the relationship may include key performance indicators, topological information, and operational information (e.g., resource states, resource data, resource locations, etc.).

In step 604, similar to step 505 in FIG. 5, the constraint management service instance 215 creates constraint(s) between inventory to be changed (e.g., created, read, updated, deleted (CURD)) and existing inventory of the telecommunications network. The constraint(s) are based on the relationships between the inventory to be changed and existing inventory entities of the telecommunications network according to the created at least one vertex.

Figure 7:
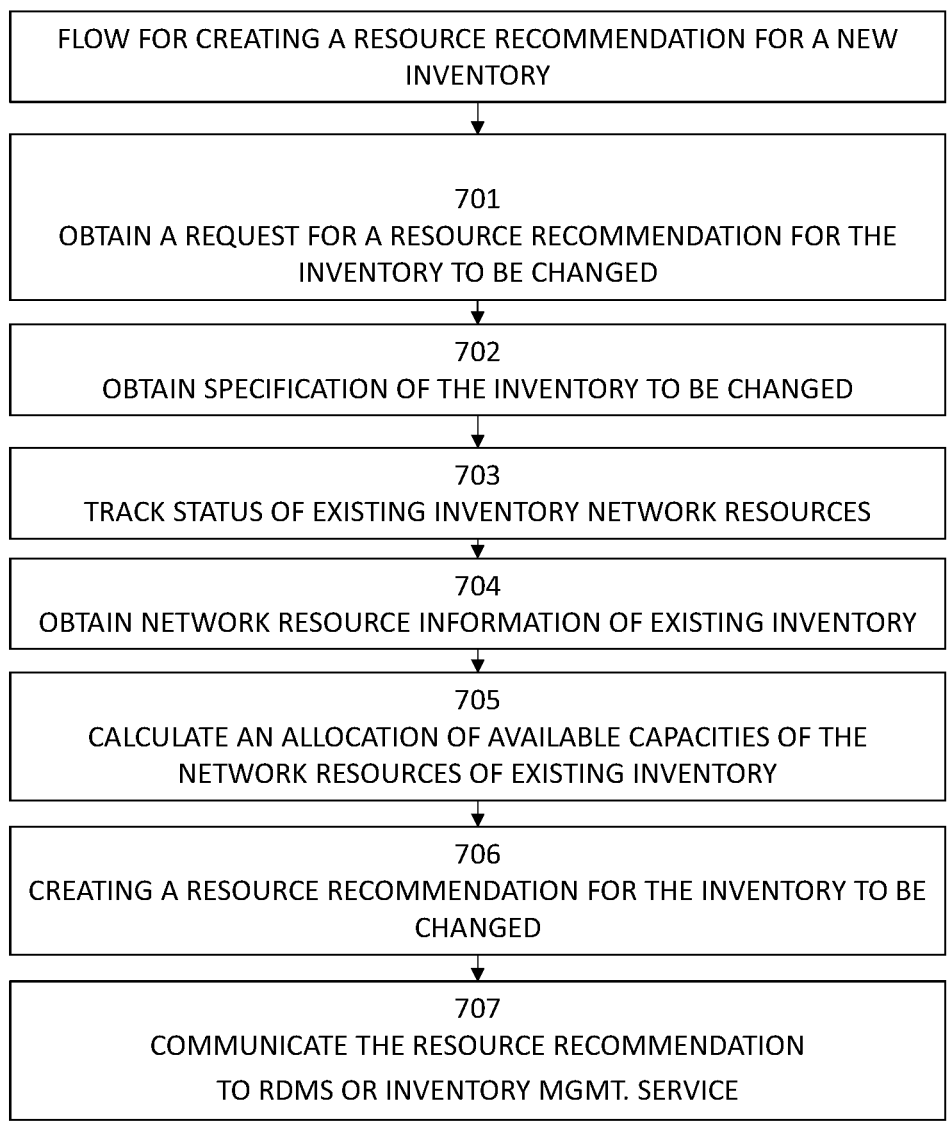
FIG. 7 illustrates a flow diagram of a method for creating a resource recommendation for an inventory to be changed in a telecommunications network inventory by a resource recommendation service of the inventory manager system according to an embodiment.

FIG. 7 illustrates a flow diagram of method 700 for creating a resource recommendation for an inventory to be changed in a telecommunications network inventory by a resource recommendation service of the inventory management system according to an embodiment.

Referring to FIG. 7, in step 701, the resource manager service 320 (e.g., as shown in FIG. 3) obtains a request for a resource recommendation. In an example embodiment, the request for a resource recommendation can be initiated by a user of the inventory management system or a subsystem via the API gateway 362 of FIG. 3.

In step 702, the resource manager service 320 obtains a specification of the inventory to be created or changed. In an example embodiment, the resource manager service 320 may obtain the specification from the RDBMS database 311 of FIG. 3.

In step 703, the resource manager service 320 tracks the status of existing network resources within the telecommunications network. In an example embodiment, the resource manager 320 may obtain the network resource information by the discover service 420 or the CMaaS 411 via the inventory manager service 410 of FIG. 4.

In step 704, the resource manager service 320 obtains network information of existing network resources (i.e., the topological information or key performance indicators (such as traffic information, load information, etc.) of the network resources of the telecommunications network).

In an example embodiment, in steps 703 and 704, up-to-date IP configurations of existing inventory can be used to specify existing resources of the telecommunications network. To this end, the discovery service 420 may scan all network resources within the telecommunications network, and the CMaaS 411 may provide the information of existing network resources (i.e., the topological information or key performance indicators (such as traffic information, load information, etc.) via the inventory manager service 410 of FIG. 4. The resource recommendation obtained may include hardware resources and resource locations of servers and datacenters within the topology of the telecommunications network.

In step 705, the resource manager service determines (i.e., calculates) the optimal allocation of available capacities of the network resources within the existing inventory of the telecommunications network. In an example embodiment, the determination may be based on topological parameters, key performance indicators, hardware resource parameters, cloud environment performance indicators, etc. The determination resource recommendation provides an optimal solution for a resource allocation to instantiate the inventory (e.g., the optimal location and optimal available hardware of a vCU server cluster for instantiating a vCU in an O-RAN network). In particular, the determination of network resources in step 705 has the advantage that a plurality of performance indicators are used in order to achieve, for example, the lowest latency timing for an instantiation of a virtual network service or a network function in an O-RAN.

In step 706, the resource manager creates a resource recommendation based on the determination in step 705. In an example embodiment, this resource recommendation may be stored as a recommendation history. This history may be used as a reference for further recommendations. In an example embodiment, the recommendation history may be stored in the RDBMS database 311 of FIG. 3.

In step 707, the resource manager service 320 communicates the resource recommendation to the inventory management service 210 of FIG. 2. In an example embodiment, the resource manager service 320 may communicate the resource recommendation directly to the inventory management service 310. In another example embodiment, the resource manager service 320 may communicate the resource recommendation via the RDBMS database 311 to inventory management service 310 of FIG. 3.

Figure 8:
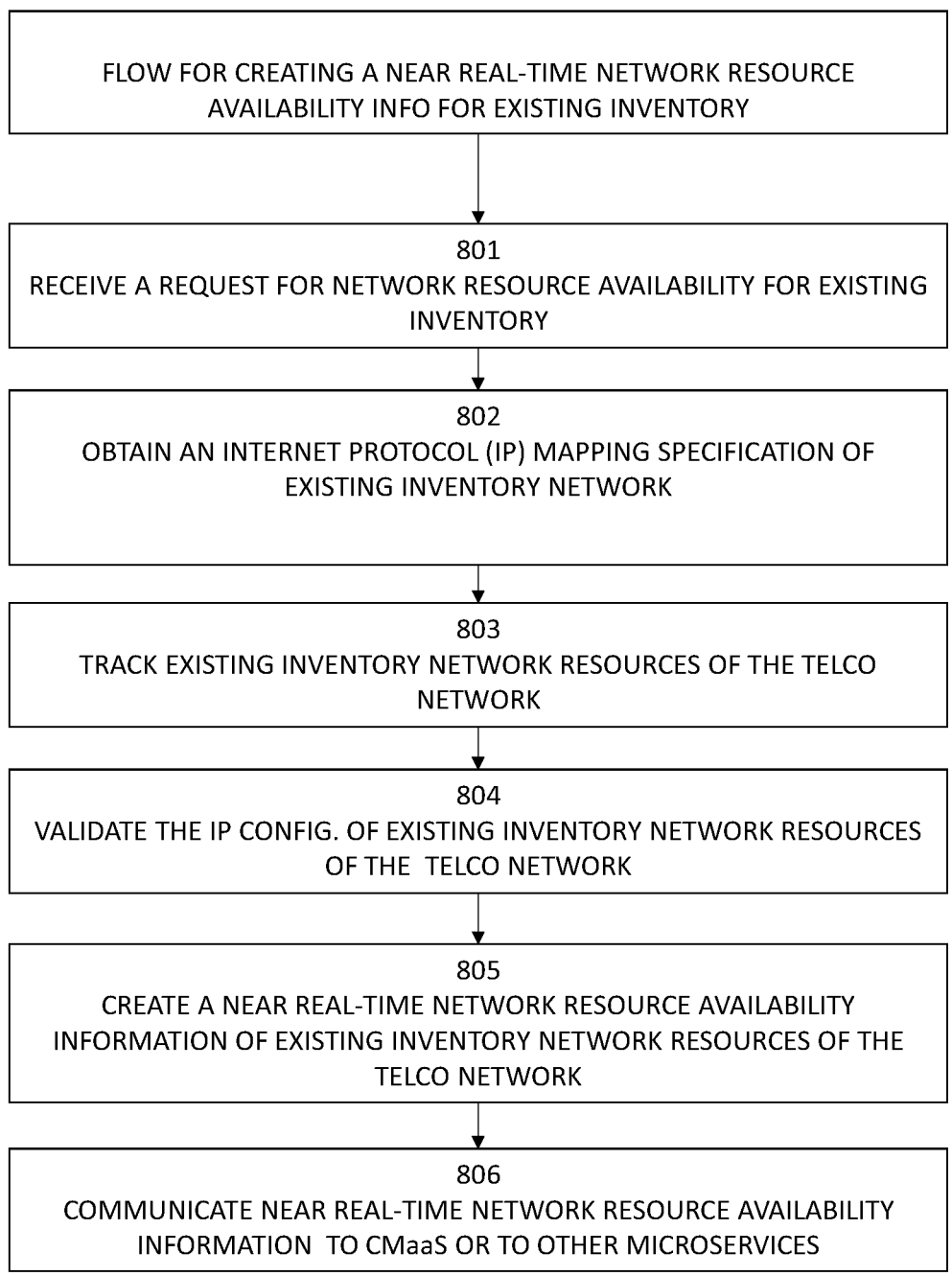
FIG. 8 illustrates a flow diagram of a method for creating near real-time network resource availability information for existing inventory in a telecommunications network by a discovery service of the inventory manager system according to an embodiment.

FIG. 8 illustrates a flow diagram of method 800 for creating near real-time network resource availability information for existing inventory in a telecommunications network by a discovery service 430 of the inventory management system according to an embodiment.

Referring to FIG. 8, in step 801, the discovery service 430 receives a request for an inventory discovery of existing (active) inventory within the telecommunications network. In an example embodiment, the request for a network component discovery can be initiated by a user of the inventory management system or a subsystem via the API gateway 462 of FIG. 4.

In step 802, the discovery service 430 obtains an IP mapping specification of the existing inventory (e.g., network components) of the telecommunications network. In an example embodiment, the IP mapping specification of network components may be provided from the inventory management service 210. In another example embodiment, the IP mapping specification of network components in the inventory may be obtained from a third-party system.

In step 803, the discovery service 430 tracks the existing (active) inventory of the network by scanning the IP configuration of network components within the existing inventory of the telecommunications network (i.e., based on the IP mapping specification the discovery service pings all existing components and determines which component is active in the telecommunications network).

In step 804, the discovery service 430 validates the IP configuration of existing inventory of the telecommunications network. In an example embodiment, the discovery service 430 may compare the IP ranges of the switches and routers with the IP mapping specification in order to check whether the received data is consistent with the IP topology of nodes in the telecommunications network.

Still referring to FIG. 8, in step 805, the resource manager service 430 creates a near real-time network resource availability information of existing (active) inventory (i.e., network components) of the telecommunications network. In an example embodiment, the discovery service 430 can connect to a CMaaS platform 431. The CMaaS platform 43 may the internet protocol (IP) configuration data of existing inventory according to the scanned IP addresses from the discovery service 130. To this end, the cloud management as a service (CMaaS) may provide labeling and configuration information of each existing inventory (e.g., inventory item or entity), real-time reporting of capacity and usage of existing entities, and reporting overstretched (i.e., overloaded) resources and locations according to its IP address.

In step 806, the discovery service 430 communicates the near real-time network resource availability information of existing (active) inventory (i.e., network components) of the telecommunications network to the cloud management as a service (CMaaS) platform 431 or the inventory manager service 110. In an example embodiment, the cloud management as a service (CMaaS) platform 431 and the discovery service 430 can connect to the inventory manager service 410. In another embodiment, the discovery service 430 may directly connect to a resource manager service 320 or to an inventory manager service 210. In another example environment, the discovery service 430 communicates the near real-time network resource availability information of existing (i.e., active) inventory (i.e., network components) of the telecommunications network to a third-party service enriching the information about the scanned (active) network components in order to obtain optimal status accuracy (e.g., up-to-date information such as key performance indicators, etc.) of said existing network components in the telecommunications network.

Figure 9:
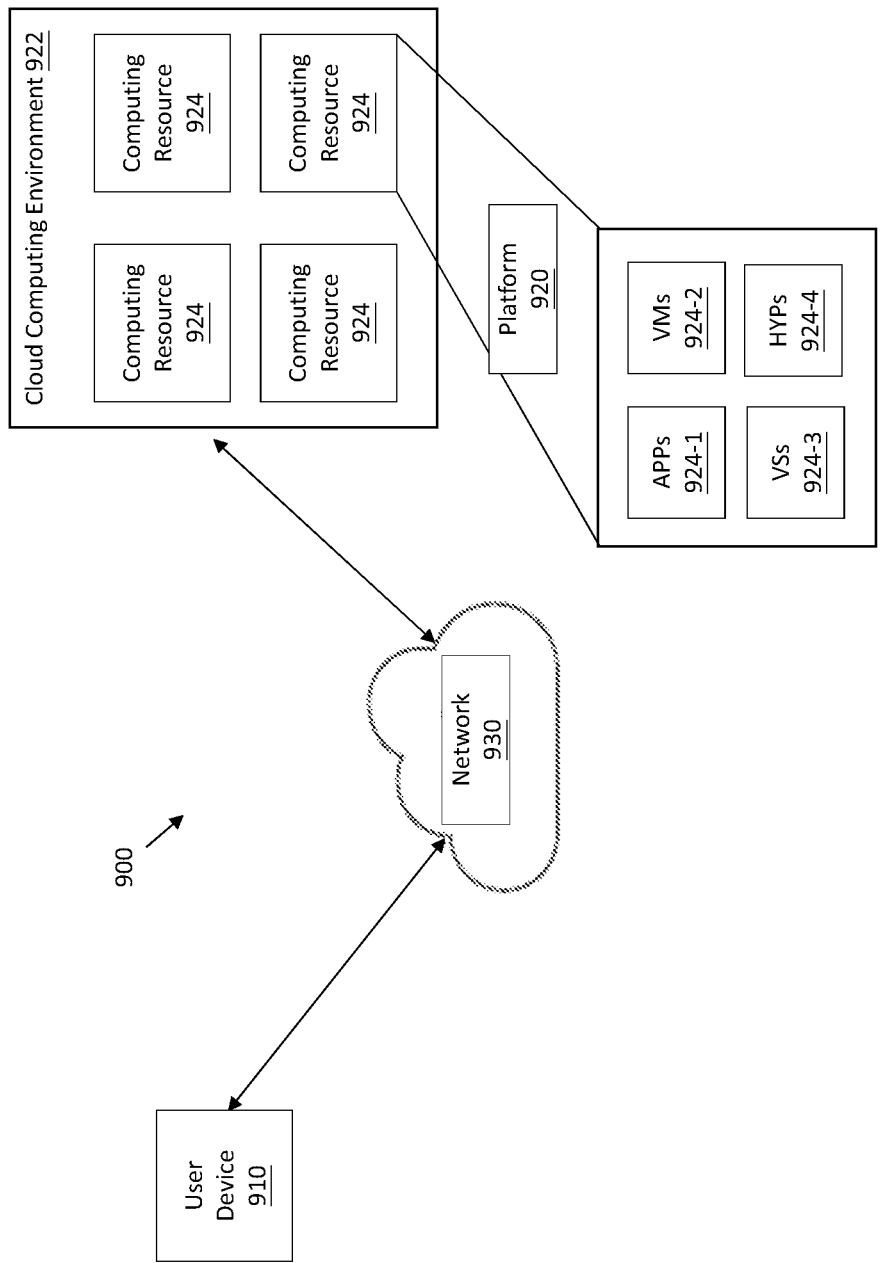
FIG. 9 is a diagram of an example environment in which systems and/or methods, described herein, may be implemented.

FIG. 9 is a diagram of an example environment 900 in which systems and/or methods, described herein, may be implemented. As shown in FIG. 9, environment 900 may include a user device 910, a platform 920, and a network 930. Devices of environment 900 may interconnect via wired connections, wireless connections, or a combination of wired and wireless connections. In embodiments, any of the functions and operations described with reference to FIGS. 1 through 8 above may be performed by any combination of elements illustrated in FIG. 9.

User device 910 includes one or more devices capable of receiving, generating, storing, processing, and/or providing information associated with platform 920. For example, user device 910 may include a computing device (e.g., a desktop computer, a laptop computer, a tablet computer, a handheld computer, a smart speaker, a server, etc.), a mobile phone (e.g., a smartphone, a radiotelephone, etc.), a wearable device (e.g., a pair of smart glasses or a smart watch), or a similar device. In some implementations, user device 910 may receive information from and/or transmit information to platform 920.

Platform 920 includes one or more devices capable of receiving, generating, storing, processing, and/or providing information. In some implementations, platform 920 may include a cloud server or a group of cloud servers. In some implementations, platform 920 may be designed to be modular such that certain software components may be swapped in or out depending on a particular need. As such, platform 920 may be easily and/or quickly reconfigured for different uses.

In some implementations, as shown, platform 920 may be hosted in cloud computing environment 922. Notably, while implementations described herein describe platform 920 as being hosted in cloud computing environment 922, in some implementations, platform 920 may not be cloud-based (i.e., may be implemented outside of a cloud computing environment) or may be partially cloud-based.

Cloud computing environment 922 includes an environment that hosts platform 920. Cloud computing environment 922 may provide computation, software, data access, storage, etc., services that do not require end-user (e.g., user device 910) knowledge of a physical location and configuration of system(s) and/or device(s) that hosts platform 920. As shown, cloud computing environment 922 may include a group of computing resources 924 (referred to collectively as "computing resources 924" and individually as "computing resource 924").

Computing resource 924 includes one or more personal computers, a cluster of computing devices, workstation computers, server devices, or other types of computation and/or communication devices. In some implementations, computing resource 924 may host platform 920. The cloud resources may include compute instances executing in computing resource 924, storage devices provided in computing resource 924, data transfer devices provided by computing resource 924, etc. In some implementations, computing resource 924 may communicate with other computing resources 924 via wired connections, wireless connections, or a combination of wired and wireless connections.

As further shown in FIG. 9, computing resource 924 includes a group of cloud resources, such as one or more applications ("APPs") 924-1, one or more virtual machines ("VMs") 924-2, virtualized storage ("VSs") 924-3, one or more hypervisors ("HYPs") 924-4, or the like.

Application 924-1 includes one or more software applications that may be provided to or accessed by user device 910. Application 924-1 may eliminate a need to install and execute the software applications on user device 910. For example, application 924-1 may include software associated with platform 920 and/or any other software capable of being provided via cloud computing environment 922. In some implementations, one application 924-1 may send/receive information to/from one or more other applications 924-1, via virtual machine 924-2.

Virtual machine 924-2 includes a software implementation of a machine (e.g., a computer) that executes programs like a physical machine. Virtual machine 924-2 may be either a system virtual machine or a process virtual machine, depending upon use and degree of correspondence to any real machine by virtual machine 924-2. A system virtual machine may provide a complete system platform that supports execution of a complete operating system ("OS"). A process virtual machine may execute a single program, and may support a single process. In some implementations, virtual machine 924-2 may execute on behalf of a user (e.g., user device 910), and may manage infrastructure of cloud computing environment 922, such as data management, synchronization, or long-duration data transfers.

Virtualized storage 924-3 includes one or more storage systems and/or one or more devices that use virtualization techniques within the storage systems or devices of computing resource 924. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 924-4 may provide hardware virtualization techniques that allow multiple operating systems (e.g., "guest operating systems") to execute concurrently on a host computer, such as computing resource 924. Hypervisor 924-4 may present a virtual operating platform to the guest operating systems, and may manage the execution of the guest operating systems. Multiple instances of a variety of operating systems may share virtualized hardware resources.

Network 930 includes one or more wired and/or wireless networks. For example, network 930 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 9 are provided as an example. In practice, there may be additional devices and/or networks, fewer devices and/or networks, different devices and/or networks, or differently arranged devices and/or networks than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) of environment 200 may perform one or more functions described as being performed by another set of devices of environment 200.

Figure 10:
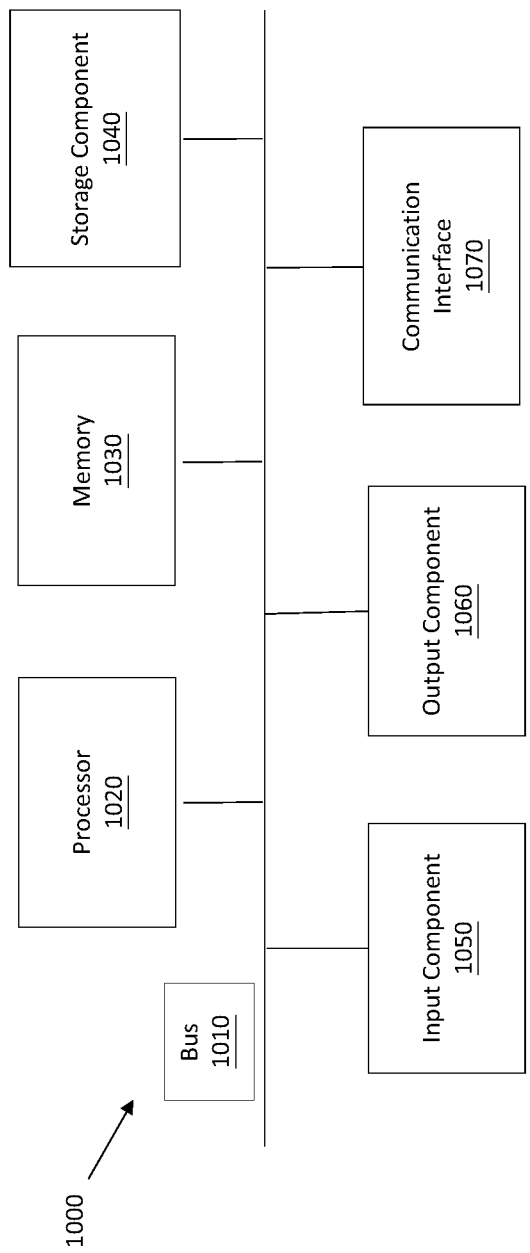
FIG. 10 is a diagram of example components of a device according to an embodiment.

FIG. 10 is a diagram of example components of a device 1000. Device 1000 may correspond to user device 910 and/or platform 920. As shown in FIG. 10, device 1000 may include a bus 1010, a processor 1020, a memory 1030, a storage component 1040, an input component 1050, an output component 1060, and a communication interface 1070.

Bus 1010 includes a component that permits communication among the components of device 1000, processor 1020 may be implemented in hardware, firmware, or a combination of hardware and software, processor 1020 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1020 includes one or more processors capable of being programmed to perform a function. Memory 1030 includes a random-access memory (RAM), a read-only memory (ROM), and/or another type of dynamic or static storage device (e.g., a flash memory, a magnetic memory, and/or an optical memory) that stores information and/or instructions for use by processor 1020.

Storage component 1040 stores information and/or software related to the operation and use of device 1000. For example, storage component 1040 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive. Input component 1050 includes a component that permits device 1000 to receive information, such as via user input (e.g., a touch screen display, a keyboard, a keypad, a mouse, a button, a switch, and/or a microphone). Additionally, or alternatively, input component 1050 may include a sensor for sensing information (e.g., a global positioning system (GPS) component, an accelerometer, a gyroscope, and/or an actuator). Output component 1060 includes a component that provides output information from device 1000 (e.g., a display, a speaker, and/or one or more light-emitting diodes (LEDs)).

Communication interface 1070 includes a transceiver-like component (e.g., a transceiver and/or a separate receiver and transmitter) that enables device 1000 to communicate with other devices, such as via a wired connection, a wireless connection, or a combination of wired and wireless connections. Communication interface 1070 may permit device 1000 to receive information from another device and/or provide information to another device. For example, communication interface 1070 may include an Ethernet interface, an optical interface, a coaxial interface, an infrared interface, a radio frequency (RF) interface, a universal serial bus (USB) interface, a Wi-Fi interface, a cellular network interface, or the like.

Device 1000 may perform one or more processes described herein. Device 1000 may perform these processes in response to processor 1020 executing software instructions stored by a non-transitory computer-readable medium, such as memory 1030 and/or storage component 1040. A computer-readable medium is defined herein as a non-transitory memory device. A memory device includes memory space within a single physical storage device or memory space spread across multiple physical storage devices.

Software instructions may be read into memory 1030 and/or storage component 1040 from another computer-readable medium or from another device via communication interface 1070. When executed, software instructions stored in memory 1030 and/or storage component 1040 may cause processor 1020 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 10 are provided as an example. In practice, device 1000 may include additional components, fewer components, different components, or differently arranged components than those shown in FIG. 10. Additionally, or alternatively, a set of components (e.g., one or more components) of device 1000 may perform one or more functions described as being performed by another set of components of device 1000.

In embodiments, any one of the operations or processes of FIGS. 1 to 8 may be implemented by or using any one of the elements illustrated in FIGS. 9 and 10.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. An inventory management system for managing functions, resources and services of a telecommunications network, the system comprising:
    a memory storing instructions; at least one first processor configured to execute first instructions, of a first microservice, to:

receive a query for a change of inventory in a telecommunications network from an application programming interface gateway;
obtain a specification of an inventory entity to be changed from a database;
evaluate the specification of the inventory entity to be changed based on type or property of the inventory entity;
create a vertex for the inventory entity to be changed among vertices of existing inventory of the telecommunications network;
create at least one relationship between the vertex of the inventory entity to be changed and the vertices of the existing inventory of the telecommunications network based on the evaluation of the specification;
create at least one constraint between the inventory entity to be changed and the existing inventory in the telecommunications network based on the at least one relationship of the inventory entity to be changed and the existing inventory in the telecommunications network;
validate the least one constraint between the inventory entity to be changed and the existing inventory of the telecommunications network; and
commit the inventory entity to be changed based on the validation of the at least one constraint between the inventory entity to be changed and the existing inventory of the telecommunications network, wherein the at least one first processor is configured to execute second instructions of a second microservice to:
  receive a request for a resource recommendation for the inventory entity to be changed from an application programming interface (API) gateway;
  obtain the specification of the inventory entity to be changed from the database;
  track status of existing inventory network resources in the telecommunications network;
  obtain network resource information of the existing inventory of the telecommunications network;
  calculate an allocation of available capacities of the network resources of the existing inventory based on the obtained network resource information; and
  create a resource recommendation for the inventory entity to be changed in the telecommunications network based on the calculated allocation of available capacities of the network resources of existing inventory.

2. The system as claimed in claim 1, wherein the at least one first processor is further configured to execute the first instructions, of the first microservice, to:
  check at least one relationship type and label from the specification of the inventory entity to be changed;
  validate the at least one relationship between each vertex of the inventory entity to be changed and the vertices of the existing inventory.

3. The system as claimed in claim 1, wherein the network resource information of the existing inventory comprises at least one of a hardware resource information, a resource location information, a resource status information and network topology information of the existing inventory of the telecommunications network.

4. The system as claimed in claim 1, wherein the at least one first processor is further configured to execute the second instructions of the second microservice to:
  store the resource recommendation in the database to create a historical list of recommendations.

5. The system as claimed in claim 1, wherein the at least one first processor is further configured to execute the second instructions of the second microservice to:
  store the resource recommendation for the inventory entity to be changed in a relational database management system (RDMS) as an update to the specification of the inventory entity to be changed, wherein the RDMS communicates with the first microservice.

6. The system as claimed in claim 1, wherein the at least one first processor is further configured to execute the second instructions, of the second microservice, to:
  communicate the resource recommendation for the inventory entity to be changed to the first microservice as a constraint between the vertex of the inventory entity to be changed and the vertices of the existing inventory in the telecommunications network.

7. The system as claimed in claim 1, wherein the at least one first processor is configured to execute third instructions, of a third microservice, to:
  receive a request for discovery and reconciliation of existing network resources of the telecommunications network;
  obtain an internet protocol (IP) mapping specification of the existing inventory network resources of the telecommunications network;
  track the existing inventory network resources of the telecommunications network based the obtained IP mapping information specification;
  validate an IP configuration of the existing inventory network resources of the telecommunications network based on the obtained IP configuration specification; and
  create a near real-time network resource availability information of the existing inventory network resources of the telecommunications network.

8. The system as claimed in claim 5, wherein the at least one first processor is further configured to execute the third instructions of the third microservice to:
  communicate the near real-time network resource availability information of existing inventory network resources of the telecommunications network to an inventory enrichment cloud management as a service platform (CMaaS), wherein the inventory enrichment CMaaS communicates with the first microservice.

9. The system as claimed in claim 7, wherein the at least one first processor is further configured to execute the third instructions of the third microservice to:
  communicate the near real-time network resource availability information to the first microservice as a constraint between the vertex of the inventory entity to be changed and the vertices of the existing inventory of the telecommunications network.

10. The system as claimed in claim 8, wherein the at least one first processor is configured to execute the second instructions of the second microservice to:
  communicate with other microservices to augment resource recommendations to utilize near real-time network resource availability information created by the third microservice.

11. The system as claimed in claim 8, wherein the near real-time network resource availability information comprises at least one of a load information, IP configuration information and network key performance indicators of available network resources in the telecommunications network.

12. A method for managing functions, resources and services of a telecommunications network, the method comprising:
- receiving, by an inventory management system, a query for a change of inventory in a telecommunications network from an application programming interface gateway;
- obtaining, by the inventory management system, a specification of an inventory entity to be changed from a database;
- evaluating, by the inventory management system, the specification of the inventory entity to be changed based on type or property of the inventory entity;
- creating, by the inventory management system, a vertex for the inventory entity to be changed among vertices of existing inventory of the telecommunications network;
- creating, by the inventory management system, at least one relationship between the vertex of the inventory entity to be changed and the vertices of the existing inventory of the telecommunications network based on the evaluation of the specification;
- creating, by the inventory management system, at least one constraint between the inventory entity to be changed and the existing inventory in the telecommunications network based on the at least one relationship of the inventory entity to be changed and the existing inventory in the telecommunications network;
- validating, by the inventory management system, the least one constraint between the inventory entity to be changed and the existing inventory of the telecommunications network; and
- committing, by the inventory management system, the inventory entity to be changed based on the validation of the at least one constraint between the inventory entity to be changed and the existing inventory of the telecommunications network, wherein the method further comprises:
- receiving a request for a resource recommendation for the inventory entity to be changed from an application programming interface (API) gateway;
- obtaining the specification of the inventory entity to be changed from the database;
- tracking status of existing inventory network resources in the telecommunications network;
- obtaining network resource information of the existing inventory of the telecommunications network;
- calculating an allocation of available capacities of the network resources of the existing inventory based on the obtained network resource information; and
- creating a resource recommendation for the inventory entity to be changed in the telecommunications network based on the calculated allocation of available capacities of the network resources of existing inventory.

13. The method as claimed in claim 12, wherein the network resource information of the existing inventory comprises at least one of a hardware resource information, a resource location information, a resource status information and network topology information of the existing inventory of the telecommunications network.

14. The method as claimed in claim 12, wherein the method further comprises:
- receiving a request for discovery and reconciliation of existing network resources of the telecommunications network;
- obtaining an internet protocol (IP) mapping specification of the existing inventory network resources of the telecommunications network;
- tracking the existing inventory network resources of the telecommunications network based the obtained IP mapping information specification;
- validating an IP configuration of the existing inventory network resources of the telecommunications network based on the obtained IP configuration specification; and
- creating a near real-time network resource availability information of the existing inventory network resources of the telecommunications network.

15. A non-transitory computer-readable recording medium having recorded thereon instructions executable by at least one processor to perform a method for managing functions, resources and services of a telecommunications network, the method comprising:
- receiving a query for a change of inventory in a telecommunications network from an application programming interface gateway;
- obtaining a specification of an inventory entity to be changed from a database;
- evaluating the specification of the inventory entity to be changed based on type or property of the inventory entity;
- creating a vertex for the inventory entity to be changed among vertices of existing inventory of telecommunications network;
- creating at least one relationship between the vertex of the inventory entity to be changed and the vertices of the existing inventory of the telecommunications network based on the evaluation of the specification;
- creating at least one constraint between the inventory entity to be changed and the existing inventory in the telecommunications network based on the at least one relationship of the inventory entity to be changed and the existing inventory in the telecommunications network;
- validating the least one constraint between the inventory entity to be changed and the existing inventory of the telecommunications network; and
- committing the inventory entity to be changed based on the validation of the at least one constraint between the inventory entity to be changed and the existing inventory of the telecommunications network, wherein the method further comprises:
- receiving a request for a resource recommendation for the inventory entity to be changed from an application programming interface (API) gateway;
- obtaining the specification of the inventory entity to be changed from the database;
- tracking status of existing inventory network resources in the telecommunications network;
- obtaining network resource information of the existing inventory of the telecommunications network;
- calculating an allocation of available capacities of the network resources of the existing inventory based on the obtained network resource information; and
- creating a resource recommendation for the inventory entity to be changed in the telecommunications network based on the calculated allocation of available capacities of the network resources of existing inventory.

16. The non-transitory computer-readable recording medium as claimed in claim 15, wherein the network resource information of the existing inventory comprises at least one of a hardware resource information, a resource location information, a resource status information and network topology information of the existing inventory of the telecommunications network.

17. The non-transitory computer-readable recording medium as claimed in claim 15, wherein the method further comprises:
receiving a request for discovery and reconciliation of existing network resources of the telecommunications network;
obtaining an internet protocol (IP) mapping specification of the existing inventory network resources of the telecommunications network;
tracking the existing inventory network resources of the telecommunications network based the obtained IP mapping information specification;
validating an IP configuration of the existing inventory network resources of the telecommunications network based on the obtained IP configuration specification; and
creating a near real-time network resource availability information of the existing inventory network resources of the telecommunications network.

* * * * *